United States Patent [19]

Weltha

[11] Patent Number: 5,222,166

[45] Date of Patent: Jun. 22, 1993

[54] AIRCRAFT FIBER OPTIC DATA DISTRIBUTION SYSTEM

[75] Inventor: M. Duane Weltha, Marion, Iowa

[73] Assignee: Rockwell International Corporation, Seal Beach, Calif.

[21] Appl. No.: 885,599

[22] Filed: May 19, 1992

[51] Int. Cl.$^5$ ............................................. G02B 6/28
[52] U.S. Cl. .................................... 385/24; 385/16; 385/20; 359/117
[58] Field of Search ............... 359/117; 385/24, 16, 385/17, 20, 21, 22, 23, 24

[56] References Cited

U.S. PATENT DOCUMENTS 3,973,169  11/1990  Slonecker ............................ 385/24
4,911,515  3/1990   So et al. ............................. 385/24 X Primary Examiner—John D. Lee
Assistant Examiner—Phan T. Heartney
Attorney, Agent, or Firm—Gregory G. Williams; M. Lee Murrah; H. Fredrick Hamann

[57] ABSTRACT

An improved aircraft fiber optic data distribution system which includes an LRM coupled by a blind mateable electric pin connector in an avionics cabinet, to an optical data link which converts the electrical signals into optical signals which is then provided through a switch system to a distant display device which is coupled to second optical data link by a blind mateable electrical pin connector which provides for the ability of an LRM to communicate with a display device over a fiber optic system without the need for blind mateable optical connectors.

3 Claims, 1 Drawing Sheet

AIRCRAFT FIBER OPTIC DATA DISTRIBUTION SYSTEM

FIELD OF THE INVENTION

The present invention generally relates to aircraft data distribution systems and more particularly concerns aircraft fiber optic data distribution systems.

BACKGROUND OF THE INVENTION

In the past, aviation engineers have utilized aircraft data distribution systems which include numerous and lengthy metal connecting wires for interconnecting the numerous electronic devices aboard a modern aircraft. In such systems, it was commonly accepted as desirable to simplify this wiring interconnect or aircraft data distribution system by including as many as possible, features or functions in any line replaceable module LRM coupled to the system. While this typical approach has been widely accepted in the industry for many years there have been reasons recently to depart from the standard metal connector systems. Consequently, a fiber optic data distribution system is emerging on modern aircraft instead of the metal connecting wire version. With the fiber optic distribution system it became necessary to convert the electrical signals in a device into optical signals so that it could be transmitted over the optical fiber to a distant device where it would be converted back into electrical signals. It was typically accomplished by providing an optical data link (ODL) inside a typical line replaceable module (LRM) which is connected to the system. These LRM's are typically housed in slide in racks and have disposed on their backside blind mateable connectors which connect the backside of the LRM and the back of the cabinet. Typically, the blind mateable optical connectors have been a segment of the overall system which has demonstrated high signal loss. As a result, much work has been done and much effort and money spent to attempt to reduce the signal loss associated with these blind mateable optical connectors.

Consequently, there exists a need to improve aircraft fiber optic data distribution systems which have a reduced signal loss due to blind mateable optical connectors.

SUMMARY OF THE INVENTION

It is an object of the present invention to provide an aircraft fiber optic data distribution system with reduced signal loss.

It is a feature of the present invention to provide hand mated fiber optic connectors between the optical fiber and any optical data link.

It is an advantage of the present invention to reduce signal loss in optical connectors.

It is yet another object of the present invention to provide an easy installation process for an LRM into an aircraft fiber optic data distribution system.

It is another feature of the present invention to provide an ODL disposed on the optical fiber and also exterior of the LRM.

It is another advantage of the present invention to eliminate the need for blind mateable optic connectors.

The present invention provides an aircraft fiber optic data distribution system, designed to satisfy the aforementioned needs, include the above described features and produce the previously stated advantages. The aircraft fiber optic data distribution system of the present invention is carried out in a "blind mateable optical connector-less" system in the sense that the typically blind mateable optical connectors disposed between the back of the LRM and the back of the cabinet have been eliminated. Instead, an electric pin connector is disposed between the LRM and the cabinet and the optical data link is disposed exterior of the LRM and adjacent to the cabinet and the fiber optic data distribution system.

Accordingly, the present invention relates to an improved aircraft fiber optic data distribution system which includes a first LRM, a second LRM, and an optical fiber extending therebetween with optical data links disposed at the ends of the optical fiber which are connected to electric pin connectors for blind mateable connection with the LRM's.

BRIEF DESCRIPTION OF THE DRAWINGS

The invention may be more fully understood by reading the following description of the preferred embodiments of the invention in conjunction with the appended drawings wherein.

DETAILED DESCRIPTION

Figure 1:
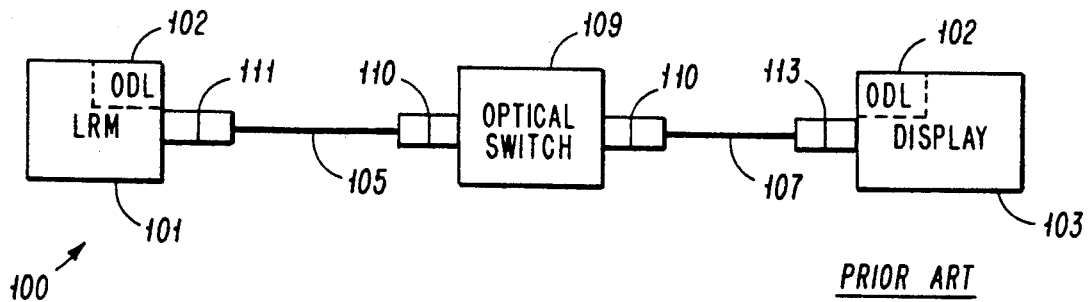
FIG. 1 is a simplified block diagram of a representative segment of a typical aircraft fiber optic data distribution system, of the prior art, which utilizes blind mated fiber optic connectors.

Now referring to the FIGURES, where like numerals refer to like structure and text throughout, and more particularly to FIG. 1, there is shown a fiber optic data distribution system, of the prior art, generally designated 100, which includes an LRM 101, which is well known in the art, with an optical data link (ODL) 102 therein, which is well known in the art, a display device 103, which is well known in the art, with an optical data link (ODL) 102 therein, a first optical fiber 105, which is well known in the art, a second optical fiber 107, which is well known in the art, an optical switch 109, which is well known in the art, disposed between optical fibers 105 and 107 and coupled there to by hand mated optical connections 110, which is well known in the art, and a first blind mated optical connector 111, which is well known in the art, disposed between LRM 101 and optical fiber 105 and a second blind mateable optical connector 113, which is well known in the art, disposed between display device 103 and optical fiber 107. A typical fiber optic data distribution system would have numerous optical fibers, LRM's, optical switches and displays, all of which are well known to the art. The apparatus shown is only a small representative segment of a much larger distribution system interconnecting many LRM's and other devices.

Figure 2:
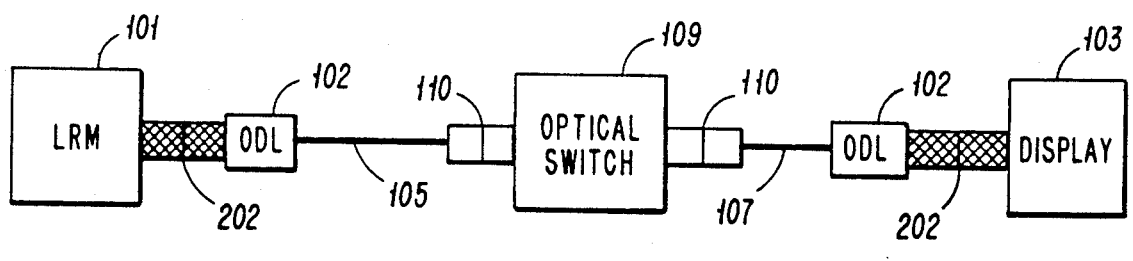
FIG. 2 is a simplified block diagram representation of a segment of an improved aircraft fiber optic data distribution system, of the present invention, which includes optical data links disposed adjacent the optical fibers and further includes blind mated electric pin connectors.

Now referring to FIG. 2, there is shown an improved aircraft fiber optic data distribution system, of the present invention, generally designated 200 having an LRM 101 and a display device 103. Disposed between an interconnecting LRM 101 and display 103 is improved fiber optic data distribution system having an optic switch 109 disposed therein. Disposed adjacent LRM 101 and also optical data link 102 is blind mateable electric pin connector 202. Optical data link 102 is coupled with optical fiber 105 which is optically coupled with optical switch 109 by hand mated optical coupler 110. Optical switch 109 is also optically coupled through another hand mated optical connector 110 to optical fiber 107 and thereby coupling with another optical data link 102 which is electrically coupled to display device 103 by blind mateable electrical pin connector 202. Blind mateable electric pin connectors are well known in the art and are generally commercially available.

The improved aircraft fiber optic data distribution system, of the present invention, generally designated 200 is shown connecting a single LRM 101 to a single display device 103. In the preferred embodiment of the present invention, numerous LRM's will be coupled to numerous display devices or other devices or other LRM's through numerous optical fibers and optical switches. The simplified block diagram of this figure is representative of only a single interconnection between an LRM and a display.

In operation, the LRM 101 generates electric signals which, are ultimately destined for the display device 103. LRM 101 outputs these electrical signals through blind mateable pin connector 202 which is disposed between the LRM and the cabinet housing (not shown) and the optical data link 102 which performs the function of converting the electrical signal output by LRM 101 into an optical signal to be transmitted along optical fiber 105. The optical signal in fiber 105 is coupled to optical switch 109 through hand mated optical connector 110. The optical switch 109 preforms the function of switching the optical signals and the various optical fibers and thereby selectively interconnecting different LRM's with different displays and other devices. The optical switch 109 is optically coupled to optical fiber 107 through hand mated optical connector 110. A second optical data link 102 is coupled with optical fiber 107 for converting the optical signals in the fiber 107 into electrical signals which are then provided to display device 103 through the blind mateable electrical pin connector 202. The advantages of the present invention are achieved by eliminating the blind mated fiber optic connector 111 and 113 (FIG. 1) and replacing them with the blind mated electrical pin connectors 202. The present invention provides for reduced signal loss by eliminating the signal loss associated with the blind mated optical connectors 111 and 113.

Figure 3:
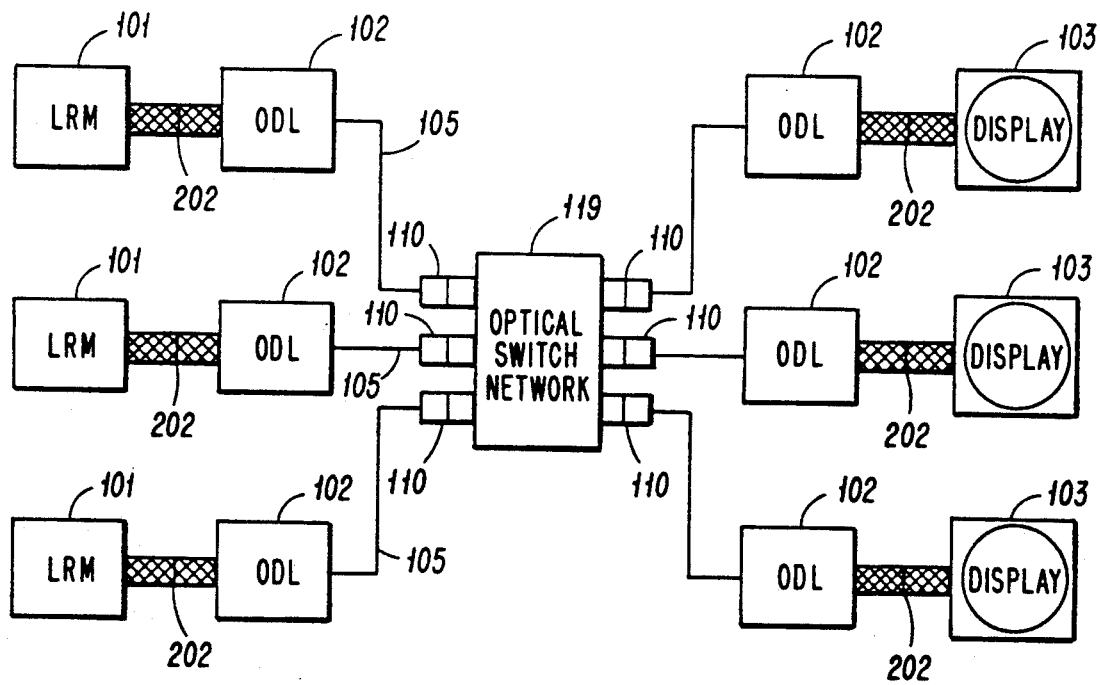
FIG. 3 is a simplified block diagram of an improved aircraft fiber optic data distribution system, of the present invention, which shows how the segment shown in FIG. 2 would be utilized to connect three LRM's and three display devices.

Now referring to FIG. 3, there is shown a simplified block diagram representation of an improved aircraft fiber optic data distribution system, of the present invention, generally designated 300, including three LRM's 101 and three display devices 103 interconnected by the fiber optic data distribution system of FIG. 2, wherein the optical switch 119 is shown to have six hand mateable optical connectors coupled thereto for coupling with the six optical fibers. The optical switch network 119 is well known in the art and is comparable to an optical switch network 119 that would used to interconnect numerous LRM's and numerous displays in a prior art fiber optic data distribution system, a segment which is described in FIG. 1.

It is believed that the improved aircraft fiber optic data distribution system, of the present invention and many of its attendant advantages will be understood by the foregoing description, and it will be apparent that various changes may be made in the form, construction, and arrangements of the parts thereof without departing from the spirit and scope of the invention or sacrificing all of its material advantages, the form herein before described being merely an exemplary embodiment thereof. It is the intention of the following claims to encompass and include such changes.

I claim:

1. An improved aircraft data distribution system, of the type interconnecting several line replaceable module LRM's and display devices on board an aircraft, the system comprising:
    an avionics cabinet, for attachment to the aircraft;
    an LRM for generating LRM electrical signals, disposed in said cabinet;
    an LRM blind mateable electrical pin connector coupled with said LRM and said cabinet;
    a first optical data link coupled with said LRM blind mateable electrical pin connector for converting said LRM electrical signals into optical signals;
    a first optical fiber coupled with said first optical data link, for providing transmission medium for the optical signals;
    a first hand mateable optical connector coupled with said first optical fiber;
    an optical switch coupled to first hand mateable optical connector, for selectively permitting transmission of the optical signals;
    a second hand mateable optical connector coupled with said optical switch;
    a second optical fiber for providing transmission of said optical signals coupled with said second hand mateable optical connectors;
    a second optical data link for converting said optical signals into display electrical signals, said optical data link coupled with said second optical fiber;
    a second blind mateable electric pin connector, coupled with said second optical data link; and,
    a display device for receiving said display electrical signals, which is coupled to said second blind mateable electric pin connector;
    whereby, LRM electrical signals are coupled through a blind mateable electrical pin connector and are converted to optical signals and are selectively provided to a second optical data link which converts the optical signals into display electrical signals which are provided to a display device through a blind mateable electrical pin connector.

2. An aircraft data distribution system comprising:
    an avionics cabinet having a plurality of slots therein for receiving a plurality of avionics line replaceable module LRM's, each of set slots in set plurality of slots having a front opening and a back plain therein;
    a plurality of avionics LRM's, for generating and receiving electrical signals, wherein in each of set pluralities of LRM's is disposed in a single slot of said plurality of slots;
    a plurality of electric pin connectors, each of said plurality having a first part and a second part wherein said first part is coupled with said back plain and said second part is coupled said avionics LRM, said first part and second part being in electrical contact when said avionics LRM is disposed in said slot;

a plurality of optical data links, each of said plurality of optical data links coupled with one of said first parts of said electrical pin connectors, for converting said electrical signals into optical signals;

a plurality of optical fibers coupled with said pluralities of optical data links; and, an optical switch coupled with said plurality of optical fibers for selectively providing optical signals among said plurality of avionics line replaceable modules.

3. An improved avionics data distribution system comprising:

an avionics cabinet disposed on an aircraf;

a first line replaceable module LRM disposed in said avionics cabinet;

a second LRM disposed in said avionics cabinet;

a third LRM disposed in said avionics cabinet and a first optical data link, a second optical data link, and a third optical data link electrically coupled with said first LRM, said second LRM and said third LRM, respectively, by a first blind mateable electrical pin connector, a second blind mateable electrical pin connector and a third blind mateable electric pin connector, respectively, a first optical fiber, a second optical fiber and a third optical fiber optically coupled said first optical data link, said second optical data link and said third optical data link, respectively;

an optical switch network for selectively switching optical signals input therein, said optical switch network coupled with said first optical fiber, said second optical fiber and said third optical fiber through first optical LRM hand mateable connector, second LRM optical hand mateable connector, and a third LRM optical hand mateable connector;

said optical switch network being optically coupled to a first display optical data link, a second display optical data link and a third optical data link through first display optical coupler, second display optical coupler, and third display optical coupler, respectively; and, a first display device, a second display device and a third display device being electrically connected with said first display optical data link, said second display optical data link and said third display optical data link, by a first display blind mateable electric pin connector, a second display blind mateable electric pin connector and a third display blind mateable electric pin connector, respectively;

wherein electrical signals can be provided selectively from said first LRM, said second LRM and said third LRM, to said first display, said second display and said third display.

* * * * *